Feb. 5, 1946. W. J. STRONG 2,394,341
COUPLING EXPANDER
Filed April 28, 1943
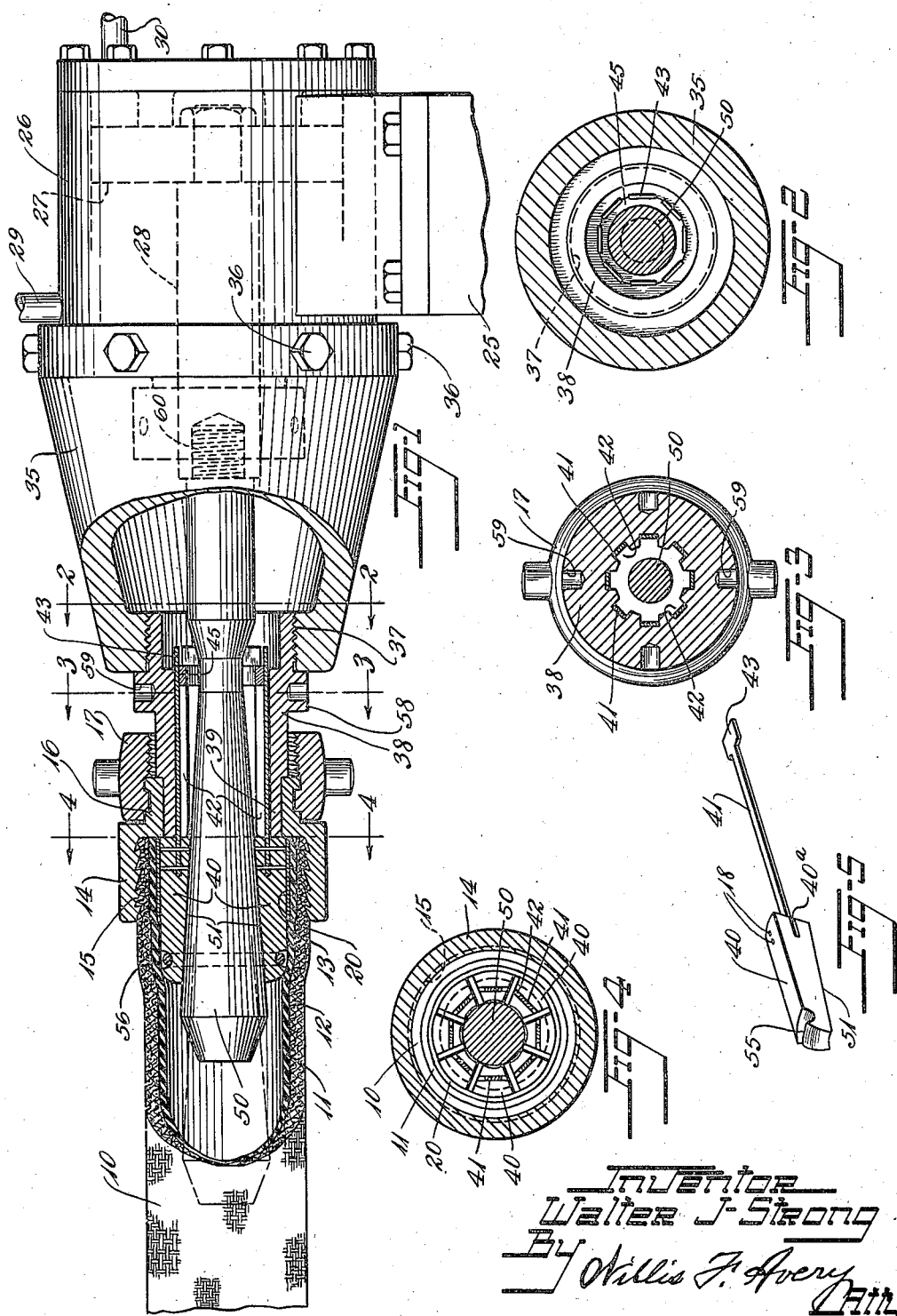

Patented Feb. 5, 1946

2,394,341

UNITED STATES PATENT OFFICE 2,394,341

COUPLING EXPANDER

Walter J. Strong, Cuyahoga Falls, Ohio, assignor to The B. F. Goodrich Company, New York, N. Y., a corporation of New York Application April 28, 1943, Serial No. 484,843

4 Claims. (Cl. 153—80)

This invention relates to apparatus for assembling couplings on flexible hose and is especially useful in expanding coupling rings into place.

In the manufacture of hose the securing of the couplings to the hose by expanding a ring of ductile metal within the bore of the hose to compress the hose wall against an annular sleeve of the coupling is an operation involving many difficulties. When the hose wall is quite compressible, as when a double cotton jacket comprises the outer part of the hose wall the expansion of the ring has been difficult due to the amount of movement of the expanding tool necessary to firmly secure the coupling. The proximity of a portion of the coupling of reduced diameter beyond the end of the hose to the coupling sleeve and the ring has further limited the available working space resulting in damage to the tool or to the reduced portion of the coupling. With hose of small bore the limited working space has made the application of couplings more difficult.

The principal objects of this invention are to provide for expanding a ring within a hose without damage to the coupling or the expanding mechanism; to provide a great degree of expansion; to provide for expanding a ring within limited working space; to provide control of the expanding means; and generally to provide simplicity of construction and efficiency of operation.

These and other objects will appear from the following description and the accompanying drawing.

Of the drawing—

Fig. 1 is a side elevation, partly in section showing apparatus constructed in accordance with and embodying the invention, with a hose section in place and a ring expanded therein within a coupling, parts being broken away.

Fig. 2 is a sectional view thereof, taken on line 2—2 of Fig. 1.

Fig. 3 is a sectional view thereof, taken on line 3—3 of Fig. 1.

Fig. 4 is a sectional view thereof, taken on line 4—4 of Fig. 1.

Fig. 5 is a perspective view of one of the expanding jaws.

Referring to the drawing, the numeral 10 designates a section of flexible hose having a rubber lining 11 and a double woven fabric jacket comprising layers 12, 13 of compressible cotton or other textile material. A coupling sleeve body is mounted on the hose and is in the form of a strong metal collar 14 having internal annular ribs 15 for gripping the hose. The coupling body also has a reduced shoulder 16 on which an internally threaded swivel ring 17 is rotatably mounted.

For securing the coupling body to the hose wall, a ductile metal ring 20 is expanded within the end of the hose opposite the coupling wall to compress the hose wall against the sleeve.

For expanding the ring 20 in place, a frame member 25 supports a double acting fluid pressure cylinder 26 having a reciprocating piston 27 and piston rod 28. Pipes 29, 30 are provided at the forward and rearward ends of the cylinder respectively whereby fluid such as water or oil may be supplied to the cylinder or exhausted therefrom to force the piston in opposite direction. A hollow anvil 35 is mounted on the forward end of the cylinder and is fixed thereto as by screws 36. It has a threaded bore 37 for engaging a hollow tubular coupling support 38 having a shouldered portion 39 adapted to slideably engage the coupling body 14 to support it.

The coupling support is also adapted to retain a plurality of segmental expander jaws 40. For the purpose of retaining each expander jaw for substantially radial movement providing equal diametrical expansion throughout the ring and preventing such dislocation of the jaws as to damage the hose or the coupling, each jaw is secured to a long flat spring 41 as by slots 40a in the jaws in which the springs engage and are secured as by removable pins 18. The springs extend lengthwise of the support and are guided by axial grooves 42 formed in the inner face of the coupling support to prevent circumferential movement of the jaws. The springs 41 have widened ends 43 which extend beyond the grooves 42 for retaining them against end movement. A locking ring 45 is seated in a counterbore of the coupling support and functionally retains the shanks of the springs 41 in place in the grooves. The arrangement is such that each jaw 40 is capable of movement radially of the axis of the coupling retainer by virtue of the flexibility of the spring and is anchored at a remote position by the spring 41, the flexible spring permitting such radial movement in approximately straight line movement without hinging due to the remote position of anchorage and the ability of the spring to flex while at the same time the jaws are held at their normal positions by the springs against displacement either inwardly or outwardly.

For moving the jaws radially to expand the ring 20, a tapered mandrel or draw-bar 50 is fixed to the piston rod 28 and is adapted to engage correspondingly tapered inner surfaces 51 of the jaws 40. The arrangement is such that when the mandrel 50 is moved to the right, as seen in Fig. 1, the jaws 40 are forced outwardly against the ring 20 expanding it to compress the hose wall against the coupling. The parts are shown in the drawing in the fully expanded condition.

For retracting the jaws 40 when the mandrel 50 is moved to the left, as seen in Fig. 1, in addition to the springs 41, each jaw 40 is formed with a groove 55 on its outer face. The grooves of the jaws are in circumferential alignment and an elastic rubber band 56 is tensioned about the jaws and seated in the grooves.

The pinned connection afforded by the pins 18 permits removal and replacement of individual jaws while the springs are retained in the coupling support.

The coupling support 38 and the expanding jaws 20 secured thereto may be removed from the anvil 35 as a unit by reason of the threaded engagement at 37. A stop collar 58 on the coupling support limits the engagement and is formed with spanner holes 59 to aid in removing and replacing it. Coupling supports and jaws of different dimensions may be substituted for accommodating hose of different size. The mandrel 50 is also threaded to engage the piston rod 28 as at 60 and may be removed for substituting mandrels of different dimensions.

In use, with the mandrel moved to the extreme left, as seen in Fig. 1, a ring 20 is slipped over the jaws 40 and a coupling 14 is slipped over the coupling support 38. The hose 10 is then slipped over the ring 20 and within the coupling. Fluid pressure is then supplied through pipe 29 to the forward end of cylinder 26 drawing mandrel 50 through jaws 40 and expanding the ring into place. Where the movement of the jaws is relatively great, the ring 20 may be expanded to non-circular shape, as shown in Fig. 4. This may be corrected by releasing the pressure and rotating the hose slightly, then applying pressure again with the jaws aligned with the inwardly flattened portions of the ring.

Variations may be made without departing from the spirit of the invention as it is defined by the following claims.

I claim:

1. Apparatus for expanding a ring within a hose to clamp it to a coupling, said apparatus comprising a hollow support for said coupling, a tapered mandrel extending through said support, means for moving said mandrel axially of said support, a plurality of segmental jaws adapted to engage the tapered surface of said mandrel and to be moved radially thereby, said jaws being located adjacent the end of said support, and a flexible spring extending through said support and having one end fixed to said support and the other end removably secured to one of said jaws, said support having means thereon extending to a position adjacent said jaws for guiding said spring and said jaw in a radial direction.

2. A hose-coupling expander comprising a hollow support for the coupling, a tapered mandrel extending through said support and movable axially therein, segmental jaws adapted to engage the tapered mandrel and to be moved radially thereby, said jaws being disposed at an end of said support and engageable with a surface of the support to limit axial movement toward the opposite end of the support, said support having axially extending guide grooves at the inner wall thereof, and said jaws having extensions guided for radial movement in said grooves and having enlarged portions at the ends of said extensions engageable with a surface of said support for limiting movement of said extensions and jaws in the reverse axial direction.

3. Apparatus for expanding a ring within a hose to clamp the hose to a coupling member, said apparatus comprising a sleeve for supporting the coupling member, a tapered mandrel extending through said sleeve, a plurality of segmental expander jaws about said mandrel at an end of said sleeve, means engaging opposite ends of said jaws for resiliently retaining said jaws against the mandrel, said means at one end of said jaws comprising elongate members each extending through said sleeve from an axially remote position, said sleeve having means for radially guiding said last named means and said jaws in an expanding movement, and means for propelling the mandrel through said jaws to expand a ring about said jaws.

4. Apparatus for expanding a ring within a hose to clamp the hose to a coupling member, said apparatus comprising a sleeve for supporting the coupling member, a tapered mandrel extending through said sleeve, a plurality of segmental expander jaws about said mandrel at an end of said sleeve, means engaging opposite ends of said jaws for resiliently retaining said jaws against the mandrel, said means at one end of said jaws comprising elongate spring members each extending through said sleeve from an axially remote position, said sleeve having means for radially guiding said last named means and said jaws in an expanding movement, and means for propelling the mandrel through said jaws to expand a ring about said jaws.

WALTER J. STRONG.